United States Patent
Arndt et al.

(10) Patent No.: US 9,328,000 B1
(45) Date of Patent: May 3, 2016

(54) MICROWAVE-BASED WATER DECONTAMINATION SYSTEM

(71) Applicant: The United States of America as represented by the Administrator of the National Aeronautics and Space Administration, Washington, DC (US)

(72) Inventors: G. Dickey Arndt, Friendswood, TX (US); Diane Byerly, Seabrook, TX (US); Marguerite Sognier, Houston, TX (US); John Dusl, Houston, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/972,807

(22) Filed: Dec. 17, 2015

Related U.S. Application Data

(62) Division of application No. 14/091,181, filed on Nov. 26, 2013, now Pat. No. 9,242,874.

(60) Provisional application No. 61/731,536, filed on Nov. 30, 2012.

(51) Int. Cl.
   *C02F 1/36* (2006.01)
   *C02F 1/38* (2006.01)
   *C02F 1/30* (2006.01)

(52) U.S. Cl.
   CPC . *C02F 1/38* (2013.01); *C02F 1/302* (2013.01); *C02F 1/36* (2013.01)

(58) Field of Classification Search
   CPC .............. C02F 9/00; C02F 1/302; C02F 1/36; C02F 1/38; C02F 1/463; C02F 1/48; C02F 1/52
   See application file for complete search history.

(56) References Cited

U.S. PATENT DOCUMENTS

| | | |
|---|---|---|
| 2,833,657 A | 1/1954 | Copson |
| 3,523,076 A | 8/1970 | Goerz, Jr. |
| 4,599,216 A | 7/1986 | Rohrer et al. |
| 4,896,010 A | 1/1990 | O'Connor et al. |
| 5,403,564 A | 4/1995 | Katschnig et al. |
| 5,667,828 A | 9/1997 | Nikdel et al. |
| 5,697,291 A | 12/1997 | Burgener et al. |
| 6,013,137 A | 1/2000 | Egner |
| 6,133,500 A | 10/2000 | Emery |
| 6,482,327 B1 | 11/2002 | Mori et al. |
| 6,740,858 B2 | 5/2004 | Tracy et al. |
| 6,824,694 B2 | 11/2004 | Kicinski |
| 7,150,836 B2 | 12/2006 | Meikrantz |
| 7,303,684 B2 | 12/2007 | Cha |
| 7,615,160 B2 | 11/2009 | Collins et al. |
| 2006/0144800 A1 | 7/2006 | Barreras et al. |
| 2007/0000845 A1 | 1/2007 | Kasevich |
| 2008/0170974 A1 | 7/2008 | Chen |
| 2011/0089118 A1 | 4/2011 | Usuki et al. |
| 2011/0114331 A1 | 5/2011 | Van Den Berg et al. |

*Primary Examiner* — Walter D Griffin
*Assistant Examiner* — Cameron J Allen
(74) *Attorney, Agent, or Firm* — Theodore U. Ro

(57) ABSTRACT

A system for decontaminating a medium. The system can include a medium having one or more contaminants disposed therein. The contaminants can be or include bacteria, fungi, parasites, viruses, and combinations thereof. A microwave energy radiation device can be positioned proximate the medium. The microwave energy radiation device can be adapted to generate a signal having a frequency from about 10 GHz to about 100 GHz. The signal can be adapted to kill one or more of the contaminants disposed within the medium while increasing a temperature of the medium by less than about 10° C.

8 Claims, 2 Drawing Sheets

MICROWAVE-BASED WATER DECONTAMINATION SYSTEM

CROSS-REFERENCE TO RELATED APPLICATIONS

This is a divisional application of application Ser. No. 14/091,181, filed on Nov. 26, 2012, which claims benefit of U.S. Provisional Application Ser. No. 61/731,536 filed Nov. 30, 2012.

ORIGIN OF THE INVENTION

The invention described herein was made in the performance of work under a NASA contract and is subject to the provisions of Section 305 of the National Aeronautics and Space Act of 1958, Public Law 85-568 (6052 Stat. 435; 42 U.S.C. 233605).

BACKGROUND

Field

Embodiments described herein generally relate to systems and methods for decontaminating a fluid without the use of chemical additives.

One challenge for the International Space Station ("ISS") and future manned space exploration is to produce sufficient quantities of potable water. Despite efforts to maintain a sterile environment, bacteria tends to accumulate in the water supplies on the ISS. Research has shown that the bacteria can mutate into strains that are highly resistant to eradication. To reduce or eliminate such bacteria, a biocide such as iodine or silver is introduced into the water. Such chemicals, however, tend to cause adverse health effects over time for the men and women drinking the water.

There is a need, therefore, for improved systems and methods for decontaminating a fluid without the use of chemical additives.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A system for decontaminating a medium is disclosed. The system can include a medium having one or more contaminants disposed therein. The contaminants can be or include bacteria, fungi, parasites, viruses, and combinations thereof. A microwave energy radiation device can be positioned proximate the medium. The microwave energy radiation device can be adapted to generate a signal having a frequency from about 10 GHz to about 100 GHz. The signal can be adapted to kill one or more of the contaminants disposed within the medium while increasing a temperature of the medium by less than about 10° C.

In another embodiment, the system can include a tubing having water disposed therein. The water can have one or more contaminants disposed therein. The contaminants can be or include bacteria, fungi, parasites, viruses, and combinations thereof. A pump can be coupled to the tubing and adapted to cause the water to flow within the tubing at a rate from about 0.1 cm$^3$/s to about 20 cm$^3$/s. A microwave energy radiation device can be positioned proximate the tubing. The microwave energy radiation device can be adapted to generate a signal having a frequency from about 10 GHz to about 100 GHz. A temperature of the water prior to being exposed to the signal can be from about 0° C. to about 50° C. The signal can be adapted to kill at least 90% of the contaminants disposed within the water while increasing the temperature of the water by less than about 10° C.

A method for decontaminating a medium is also disclosed. The method can include generating a signal with a microwave energy radiation device. The signal can have a frequency from about 10 GHz to about 100 GHz. The signal can be directed toward a medium having one or more contaminants therein. The signal can be adapted to kill at least 90% of the contaminants disposed within the medium while increasing the temperature of the medium by less than about 10° C.

DETAILED DESCRIPTION

Figure 1:
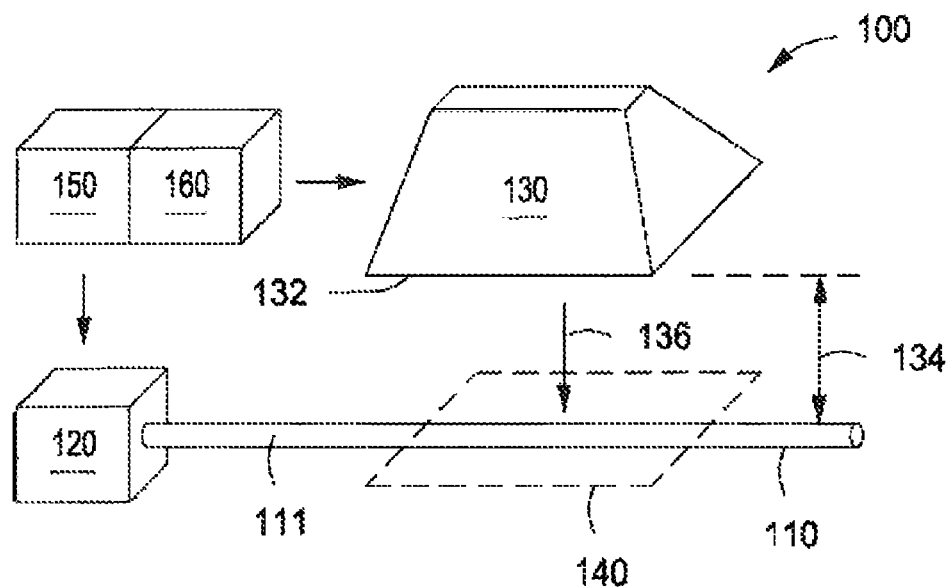
FIG. 1 depicts a schematic view of an illustrative system for decontaminating a medium, according to one or more embodiments disclosed.

FIG. 1 depicts a schematic view of an illustrative system 100 for decontaminating a medium, according to one or more embodiments. The system 100 can include a tubing 110, a pump 120, and a microwave energy radiation device 130. The tubing 110 can be one or more pieces or components connected together, and can have a bore formed axially therethrough. The tubing 110 can be a flexible tubing made of polypropylene, polyethylene, polyurethane, neoprene, plastic, glass, or any combination thereof. An illustrative tubing 110 can be Tygon® tubing. The medium can be a fluid 111 within a non-metallic material (e.g., tubing 110), as shown in FIG. 1, or the medium can be a solid material, such as a filter 450, as shown and discussed below with regard to FIG. 4.

The tubing 110 can have an inner diameter ranging from about 1 mm, about 2 mm, about 3 mm, about 4 mm, or about 5 mm to about 10 mm, about 15 mm, about 20 mm, about 50 mm, about 100 mm, or more. For example, the inner diameter can be from about 1 mm to about 5 mm, about 5 mm to about 10 mm, about 10 mm to about 20 mm, about 20 mm to about 50 mm, or about 1 mm to about 20 mm. The tubing 110 can have a wall thickness ranging from about 0.1 mm, about 0.2 mm, about 0.3 mm, about 0.4 mm, or about 0.5 mm to about 0.6 mm, about 0.8 mm, about 1 mm, about 2 mm, about 5 mm, or more. For example, the wall thickness can be from about 0.1 mm to about 0.5 mm, about 0.5 mm to about 1 mm, about 1 mm to about 5 mm, or from about 0.1 mm to about 5 mm.

The pump 120 can be coupled to or in contact with at least a portion of the tubing 110. The pump 120 can be adapted to cause the fluid 111 to flow through the tubing 110. In at least one embodiment, the pump 120 can be a peristaltic pump that squeezes or compresses a portion of the tubing 110, thereby forcing the fluid 111 to move through the tubing 110. Thus, the pump 120 does not come in contact with the fluid 111, and the fluid 111 and the tubing 110 can be referred to as a "closed system." As a result, the system 100 can be used in both gravity and microgravity environments (e.g., the international space station).

The pump 120 can cause the fluid 111 to flow through the tubing 110 at a linear flow rate ranging from about 0.5 cm/s, about 1 cm/s, about 2 cm/s, about 3 cm/s, about 4 cm/s, or about 5 cm/s to about 7.5 cm/s, about 10 cm/s, about 15 cm/s, about 20 cm/s, about 50 cm/s, about 100 cm/s, or more. For example, the linear flow rate can be from about 0.5 cm/s to about 2 cm/s, about 2 cm/s to about 5 cm/s, about 5 cm/s to about 10 cm/s, about 10 cm/s to about 20 cm/s, about 20 cm/s to about 50 cm/s, or about 0.5 cm/s to about 20 cm/s. The pump 120 can cause the fluid 111 to flow through the tubing 110 at a volumetric flow rate ranging from about 0.1 $cm^3/s$, about 0.5 $cm^3/s$, about 1 $cm^3/s$, about 2 $cm^3/s$, or about 3 $cm^3/s$ to about 5 $cm^3/s$, about 7.5 $cm^3/s$, about 10 $cm^3/s$, about 20 $cm^3/s$, about 50 $cm^3/s$, about 100 $cm^3/s$, or more. For example, the volumetric flow rate can be from about 0.1 $cm^3/s$ to about 1 $cm^3/s$, about 1 $cm^3/s$ to about 5 $cm^3/s$, about 5 $cm^3/s$ to about 20 $cm^3/s$, or about 0.1 $cm^3/s$ to about 20 $cm^3/s$.

The fluid 111 can be a liquid, a gas, or a combination thereof. More particularly, the fluid 111 can be or include water, steam, or combinations thereof. The fluid 111 can have one or more contaminants disposed therein. The contaminants can be or include organic material such as bacteria (e.g., fluid-borne live bacteria), fungi, parasites, viruses, or any combination thereof disposed therein. Illustrative contaminants can include *Burkholderia Cepacia, Staphylococcus Epidermidis, Cupriavidus Metallidurans,* and *Streptococcus Mutans.*

The microwave energy radiation device 130 can be positioned proximate at least a portion of the tubing 110. A signal-emitting surface 132 of the microwave energy radiation device 130 that is directed toward the tubing 110 can have an area ranging from about 0.5 $cm^2$, about 1 $cm^2$, about 2 $cm^2$, about 3 $cm^2$, or about 4 $cm^2$ to about 6 $cm^2$, about 8 $cm^2$, about 10 $cm^2$, about 20 $cm^2$, about 50 $cm^2$, about 100 $cm^2$, about 500 $cm^2$, about 1000 $cm^2$, or more. For example, the area of the surface 132 can be from about 0.5 $cm^2$ to about 2 $cm^2$, about 2 $cm^2$ to about 5 $cm^2$, about 5 $cm^2$ to about 10 $cm^2$, about 10 $cm^2$ to about 20 $cm^2$, or about 20 $cm^2$ to about 50 $cm^2$.

A shortest distance 134 between the surface 132 of the microwave energy radiation device 130 and outer surface of the tubing 110 can range from about 0.5 cm, about 1 cm, about 2 cm, about 3 cm, about 4 cm, or about 5 cm to about 7.5 cm, about 10 cm, about 15 cm, about 20 cm, about 30 cm, or more. For example, the distance 134 can less than about 30 cm, less than about 20 cm, less than about 10 cm, less than about 5 cm, less than about 2.5 cm, or less than about 1 cm.

The microwave energy radiation device 130 can be an antenna adapted to output a microwave energy radiation signal 136. The signal 136 can have a frequency from about 100 MHz, about 500 MHz, about 1 GHz, about 3 GHz, about 5 GHz, about 10 GHz, about 15 GHz, about 20 GHz, or about 25 GHz to about 30 GHz, about 35 GHz, about 40 GHz, about 45 GHz, about 50 GHz, about 100 GHZ, about 200 GHz, about 300 GHz, or more. For example, the frequency can be from about 1 GHz to about 5 GHz, about 5 GHz to about 10 GHz, about 10 GHz to about 20 GHz, about 20 GHz to about 50 GHz, about 50 GHz to about 100 GHz, about 100 GHz to about 300 GHz, or about 10 GHz to about 100 GHz. In another embodiment, the frequency can be from about 5 GHz to about 15 GHz, about 15 GHz to about 25 GHz, about 25 GHz to about 35 GHz, about 35 GHz to about 45 GHz, or about 20 GHz to about 40 GHz. The frequency or frequency range can be selected to kill or ablate at least a portion of the contaminants in the fluid 111.

The signal 136 can have a power ranging from a low of about 1 watt, about 2 watts, about 3 watts, about 4 watts, or about 5 watts to about 7.5 watts, about 10 watts, about 25 watts, about 50 watts, about 100 watts, about 250 watts, about 500 watts, or more. For example, the power can be from about 1 watt to about 5 watts, about 5 watts to about 10 watts, about 10 watts to about 15 watts, about 15 watts to about 30 watts, about 30 watts to about 50 watts, about 1 watt to about 20 watts, about 1 watt to about 50 watts, or about 50 watt to about 500 watts.

The signal 136 can generate an exposure area 140, and at least a portion of the tubing 110 can be disposed within the exposure area 140. As shown in FIG. 1, the tubing 110 can be in a substantially linear orientation as it passes through the exposure area 140. As used herein, "exposure area" refers to the area in which the tubing 110 and the fluid 111 disposed therein are exposed to a power greater than about 1 watt. The exposure area 140 can range from about 10 $cm^2$, about 50 $cm^2$, about 100 $cm^2$, about 150 $cm^2$, or about 200 $cm^2$ to about 400 $cm^2$, about 600 $cm^2$, about 800 $cm^2$, about 1,000 $cm^2$, about 2,000 $cm^2$, or more. For example, the exposure area 140 can be from about 10 $cm^2$ to about 50 $cm^2$, about 50 $cm^2$ to about 100 $cm^2$, about 100 $cm^2$ to about 200 $cm^2$, about 200 $cm^2$ to about 500 $cm^2$, about 500 $cm^2$ to about 1000 $cm^2$, or about 10 $cm^2$ to about 500 $cm^2$.

A controller 150 can be coupled to the tubing 110, the pump 120, the microwave energy radiation device 130, or any combination thereof. The controller 150 can include software and/or firmware. The controller 150 can be adapted to control one or more aspects of the system 100. For example, the controller 150 can control the pump 120, which can vary the flow rate of the fluid 111 through the tubing 110. The controller 150 can also control the frequency and/or wavelength of the signal 136 generated by the microwave energy radiation device 130 and/or the power of the signal 136 generated by the microwave energy radiation device 130. In at least one embodiment, the flow rate of the fluid 111 through the tubing 110 can be adjusted to a predetermined rate by the controller 150, and the predetermined rate can be designed to kill at least a portion of any living contaminants in the fluid 111 by exposing the contaminates to the microwave energy radiation signal 136 from the microwave energy radiation device 130 for a predetermined amount of time. The controller 150 can also tune the signal 136 to be a continuous wave or a time-varying wave.

A monitoring device 160 can be coupled to the tubing 110, the microwave energy radiation device 130, the controller 150, or combinations thereof. The monitoring device 160 can be or include one or more sensors, alarms, combinations thereof, and the like. The monitoring device 160 can be adapted to measure or monitor the frequency of the signal 136, the power of the signal 136 (e.g., output power and/or reflective power), the flow rate of the fluid 111 through the tubing 110, the length of time that the fluid 111 (and the bacteria) is within the exposure area 140, the temperature of the fluid 111, the presence or absence of contaminants (e.g., living microbes) in the fluid 111, and combinations thereof. The monitoring device 160 can diagnose or identify faults or errors in the system 100 and communicate the faults or errors to the controller 150.

Figure 2:
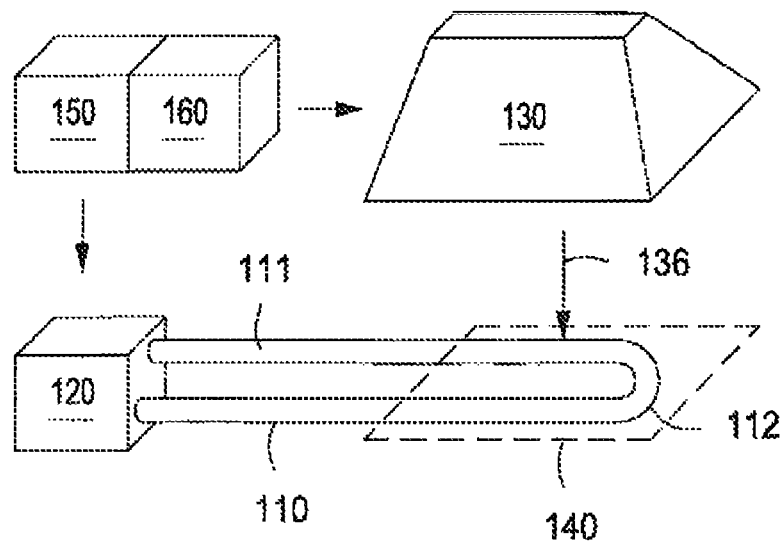
FIG. 2 depicts another schematic view of the system shown in FIG. 1 with the tubing in a different configuration, according to one or more embodiments disclosed.

FIG. 2 depicts another schematic view of the system 100 shown in FIG. 1 with the tubing 110 in a different configuration, according to one or more embodiments. As shown in FIG. 2, the tubing 110 can be substantially "U" shaped within the exposure area 140. By including a bend 112 (e.g., 180°) in the tubing 110, the length of the tubing 110 in the exposure area 140 can be approximately doubled. As a result, the length of time that the fluid 111 is disposed within the exposure area 140, and the amount of fluid 111 disposed within the exposure area 140, is approximately doubled. As discussed in greater detail below, this can increase the amount of bacteria that is killed or ablated within the fluid 111. As shown, the tubing 110 can form a loop so that the fluid 111 can flow through the exposure area 140 two or more times.

Figure 3:
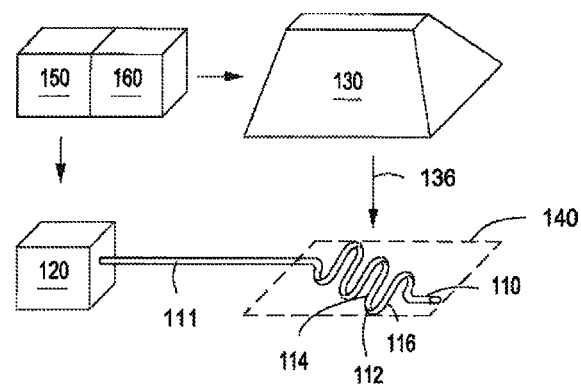
FIG. 3 depicts another schematic view of the system shown in FIG. 1 with the tubing in a different configuration, according to one or more embodiments disclosed.

FIG. 3 depicts another schematic view of the system 100 shown in FIG. 1 with the tubing 110 in a different configuration, according to one or more embodiments. As shown in FIG. 3, the tubing 110 can include a plurality of bends 112 such that the tubing 110 is in a substantially sinusoidal or "zig-zag" orientation within the exposure area 140. By including a plurality of bends 112 in the tubing 110, the length of the tubing 110 in the exposure area 140 can be increased even more than the "U" shaped embodiment shown in FIG. 2. The angle of the bends 112 or the radius of curvature of the bends 112 can be decreased to place adjacent legs 114, 116 of the tubing 110 closer to one another. This can increase the length of tubing 110 within the exposure area 140 even further. As a result, the length of time that the fluid 111 is disposed within the exposure area 140, and the amount of fluid 111 disposed within the exposure area 140, can be increased, which in turn, increases the amount of bacteria that is killed or ablated.

Although shown in a linear configuration (FIG. 1), a "U" shaped configuration (FIG. 2), and a sinusoidal configuration (FIG. 3), it may be appreciated that the tubing 110 can be in any shape or configuration. In at least one embodiment, the tubing 110 can be in a spiral, helical, or coiled configuration.

In operation, the pump 120 can cause the fluid 111 to flow through the tubing 110. As the fluid 111 flows through the portion of the tubing 110 disposed within the exposure area 140, the signal 136 from the microwave energy radiation device 130 can kill or ablate at least a portion of the contaminants in the fluid 111. The signal 136 can kill at least 50% of the contaminants, at least 60% of the contaminants, at least 70% of the contaminants, at least 80% of the contaminants, at least 90% of the contaminants, at least 95% of the contaminants, or at least 99% of the contaminants.

While the signal 136 can kill the contaminants within the exposure area 140, the signal 136 can also kill contaminants outside the exposure area 140 as well. However, as may be appreciated, the amount or rate of contaminants that are killed outside the exposure area 140 can be less than the amount or rate of contaminants that are killed within the exposure area 140. In at least one embodiment, the amount or rate of contaminants that are killed outside the exposure area can be minimal.

The amount or rate of the contaminants killed by the signal 136 can depend, at least in part, upon the frequency of the signal 136, the power of the signal 136, the flow rate of the fluid 111 through the tubing 110, the length of time that the fluid 111 (and the contaminants) are within the exposure area 140, the material of the tubing 110, the thickness of the tubing 110, the type of contaminants, and combinations thereof.

The amount or rate of the contaminants killed by the signal 136 can be increased by increasing the power of the signal 136. Similarly, the amount or rate of the contaminants killed by the signal 136 can be increased by increasing the length of time that the fluid and the contaminants are within the exposure area 140. The time can be increased by reducing the flow rate of the fluid 111 through the tubing 110 and/or by varying the orientation of the tubing 110 (e.g., to a "U" shape or sinusoidal pattern) to increase the total length of the tubing 110 within the exposure area 140. In at least one embodiment, the fluid 111 can be stationary within the tubing 110.

The time that the fluid 111 circulates through the tubing 110 and/or the exposure area 140 can be from about 5 seconds, about 10 seconds, about 15 seconds, about 20 seconds, about 30 seconds, about 45 seconds, or about 1 minute to about 2 minutes, about 3 minutes, about 4 minutes, about 5 minutes, about 10 minutes, about 20 minutes, about 30 minutes, about 1 hour, or more. For example, the time can be from about 5 Seconds to about 30 seconds, about 30 seconds to about 1 minute, about 1 minute to about 2 minutes, about 2 minutes to about 5 minutes, about 5 minutes to about 10 minutes, about 10 minutes to about 30 minutes, or about 5 seconds to about 5 minutes.

The exposure to the signal 136 can increase the temperature of the fluid 111 (and the contaminants). The amount that the fluid 111 increases in temperature can depend, at least in part, on the power of the signal 136, the frequency of the signal 136, the flow rate of the fluid 111 through the tubing 110, the length of time that the fluid 111 (and the contaminants) circulate through the tubing 110 and/or the exposure area 140, the material of the tubing 110, the thickness of the tubing 110, and combinations thereof. For example, the temperature of the fluid 111 can increase as the time that the fluid 111 are within the exposure area increases.

Prior to flowing through the exposure area 140 and being introduced to the signal 136, the fluid 111 can have a temperature ranging from about 0° C., about 5° C., about 10° C., about 15° C., or about 20° C. to about 30° C., about 40° C., about 60° C., about 80° C., about 100° C., or more. For example, the temperature of the fluid 111 can be from about 0° C. to about 10° C., about 10° C. to about 20° C., about 20° C. to about 30° C., about 30° C. to about 40° C., about 40° C. to about 60° C., about 60° C. to about 80° C., about 80° C. to about 100° C., or about 0° C. to about 50° C.

When the fluid 111 circulates through the tubing 110 and/or the exposure area 140 for the duration above, the temperature of the fluid 111 can increase by less than 0.1° C., less than 0.25° C., less than 0.5° C., less than 0.75° C., less than 1° C., less than 1.25° C., less than 1.5° C., less than 1.75° C., less than 2° C., less than 2.5° C., less than 3° C., less than 4° C., less than 5° C., less than 7.5° C., or less than 10° C. As may be appreciated, the longer that the fluid 111 is exposed to the signal 136, the greater the temperature increase of the fluid 111, and vice versa.

The microwave energy radiation signal 136 kills the living contaminants via absorbed heat through mechanisms comparable to other biological processes induced by heat, such as denaturation of enzymes, proteins, nucleic acids, or other vital components. By using relatively high frequencies, the fluid 111 is not significantly heated. As such, this type of decontamination of the fluid 111 can be referred to as "non-thermal" in the sense that the fluid 111 itself is not being significantly heated to kill the living contaminants. Rather, the microwave energy radiation signal 136 kills the living contaminants directly. As a result, no additional chemical additives are required to kill the living contaminants. This method of killing the living contaminants can be used in combination with other known decontaminating technologies such as the use of ultraviolet energy or filters to trap living contaminants.

Figure 4:
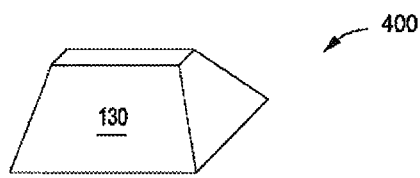
FIG. 4 depicts a schematic view of another illustrative system for decontaminating a medium, according to one or more embodiments disclosed.

FIG. 4 depicts a schematic view of an illustrative system 400 for decontaminating a filter 450, according to one or more embodiments. The filter 450 can be used to remove contaminants or particulates from a fluid (e.g., water). This filter 450 can include a series of small openings for the circulating fluid to pass through, and some of the contaminants can be captured by the filter 450 and not pass through the openings.

As the filter 450 removes contaminants and/or particulates from the fluid, the contaminants and/or particulates can become entrained within the filter 450. The contaminants can be the same as those discussed above. In at least one embodiment, the contaminants can form a biofilm on the filter 450. The biofilm can be a collection of bacteria within the circulating fluid that adheres to the surface of the filter 450 and creates a film of living bacteria and/or organisms. This biofilm can be more difficult to kill than the bacteria alone.

To remove the contaminants and/or bioflim from the filter 450, the filter 450 can be placed in the exposure area 140 in front of the microwave energy radiation device 130. The distance between the surface 132 of the microwave energy radiation device 130 and the filter 450 can be the same as the distance 134 described above (e.g., about 0.5 cm to about 20 cm). The (stationary) filter 450 can be exposed to the signal 136 from the microwave energy radiation device 130, which can kill or ablate the contaminants and/or biofilm on the filter 450.

Figure 5:
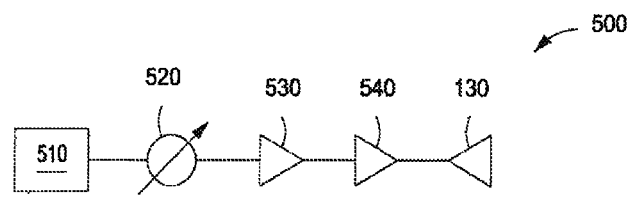
FIG. 5 depicts a schematic view of an illustrative circuit for providing a signal to the antenna, according to one or more embodiments disclosed.

FIG. 5 depicts a schematic view of an illustrative circuit 500 for providing a signal to the microwave energy radiation device 130, according to one or more embodiments. The circuit 500 can include a signal source 510, an attenuator 520, a preamplifier 530, an amplifier 540, and the microwave energy radiation device 130. The signal source 510 provides a low power, selectable frequency signal to the amplifier 540, which boosts the signal. The resultant signal is a single frequency of microwave energy with a relatively high output power (e.g., 1 watt to 50 watts).

The attenuator 520 can be coupled to the signal source 510 and adapted to receive a signal therefrom. The attenuator 520 can reduce the power of the signal while keeping the signal's waveform substantially intact. The attenuator 520 can facilitate impedance matching between the signal source 510 and the load (i.e., the microwave energy radiation device 130).

The preamplifier 530 can be coupled to the attenuator 520 and adapted to receive the signal therefrom. The preamplifier 530 prepares the signal for amplification by the amplifier 540. The preamplifier 530 boosts the power of the signal without significantly degrading the signal-to-noise ratio. The preamplifier 530 can provide a voltage gain but no significant current gain.

The amplifier 540 can be coupled to the preamplifier 530 and adapted to receive the signal therefrom. The amplifier 540 increases the voltage and power of the signal. The microwave energy radiation device 130 can be coupled to the amplifier 540 and adapted to receive the signal therefrom. The microwave energy radiation device 130 converts the power of the signal into electromagnetic radio waves. The radio waves form the exposure area 140.

EXAMPLES

To provide a better understanding of the foregoing discussion, the following non-limiting examples are provided.

Table 1 below shows the percentage of bacteria killed when a single drop of water was exposed to a signal 136 having a power of 9 watts and a frequency of 29.7 GHz. The microwave energy radiation device 130 had a surface area of 2.4 $cm^2$. The bacteria in the water was *Burkholderia Cepacia*.

TABLE 1

| Trial | Percentage of Bacteria Killed | Exposure Time |
|---|---|---|
| 1 | 68 | 15 seconds |
| 2 | 90.5 | 15 seconds |
| 3 | 97 | 30 seconds |
| 4 | 99.4 | 45 seconds |
| 5 | 99.8 | 60 seconds |
| 6 | 99.9 | 60 seconds |
| 7 | 99.9 | 60 seconds. |
| 8 | 100 | 60 seconds |
| 9 | 100 | 60 seconds |
| 10 | 99.9 | 60 seconds |
| 11 | 100 | 60 seconds |

Table 2 below shows the percentage of bacteria killed when stationary water in the tubing 110 was exposed to a signal 136 having a power of 9 watts and a frequency of 29.7 GHz. The microwave energy radiation device 130 had a surface area of 2.4 $cm^2$. The duration was 1 minute.

TABLE 2

| Trial | Percentage of Bacteria Killed | Type of Bacteria |
|---|---|---|
| 1 | 90 | *Staphylococcus Epidermidis* |
| 2 | 100 | *Staphylococcus Epidermidis* |
| 3 | 77 | *Burkholderia Cepacia* |
| 4 | 82 | *Burkholderia Cepacia* |
| 5 | 90 | *Burkholderia Cepacia* |
| 6 | 99 | *Burkholderia Cepacia* |
| 7 | 96 | *Burkholderia Cepacia* |

Table 3 below shows the percentage of bacteria killed when water flowed through the tubing 110 and the exposure area 140 (in a loop, as shown in FIG. 2). The water was exposed to a signal 136 having a power of 4 watts and a frequency of 29.7 GHz. The microwave energy radiation device 130 had a surface area of 2.4 $cm^2$. The bacteria in the water was *Burkholderia Cepacia*. The exposure time refers to the time that a particular volume of the fluid (e.g., droplet) is within the exposure area 140.

TABLE 3

| Trial | Percentage of Bacteria Killed | Exposure Time |
|---|---|---|
| 1 | 52 | 11 seconds |
| 2 | 83 | 11 seconds |
| 3 | 67 | 11 seconds |
| 4 | 68 | 11 seconds |
| 5 | 87 | 11 seconds |
| 6 | 49 | 11 seconds |
| 7 | 97 | 22 seconds |
| 8 | 97 | 22 seconds |
| 9 | 94 | 22 seconds |

Table 4 below shows the temperature increase of the water when the water flowed through the tubing 110 and the exposure area 140 (in a loop, as shown in FIG. 2) at a rate of about 0.5 $cm^3/s$. The water was exposed to a signal 136 having a power of 5 watts and a frequency of 29.7 GHz. The microwave energy radiation device 130 had a surface area of 2.4 $cm^2$. The exposure time refers to the time that a particular volume of the fluid (e.g., a droplet) is within the exposure area 140.

TABLE 4

| Trial | Temperature increase | Exposure Time |
|---|---|---|
| 1 | 0.55° C. (1° F.) | 7.5 seconds |
| 2 | 0.55° C. (1° F.) | 540 seconds |

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

Although only a few exemplary embodiments have been described in detail above, those skilled in the art will readily appreciate that many modifications are possible in the exemplary embodiments without materially departing from the novel teachings and advantages of this invention. Accordingly, all such modifications are intended, to be included within the scope of this invention as defined in the following claims. In the claims, means-plus-function and step-plus-function clauses are intended to cover the structures or acts described herein as performing the recited function and not only structural equivalents, but also equivalent structures. Thus, although a nail and a screw may not be structural equivalents in that a nail employs a cylindrical surface to secure parts together, whereas a screw employs a helical surface, in the environment of fastening parts, a nail and a screw may be equivalent structures.

What is claimed is:

1. A method for decontaminating a medium having one or more contaminants disposed therein and an initial temperature comprising:
    providing a microwave energy radiation device comprised of a signal-emitting surface having an area from about 0.5 $cm^2$ to about 100 $cm^2$;
    generating a signal having a frequency from about 10 GHz to about 100 GHz with the microwave energy radiation device;
    directing the signal toward the medium;
    exposing the one or more contaminants to the signal for a predetermined amount of time;
    increasing the initial temperature of the medium by less than 10° C.; and
    killing at least 90% of the contaminants.

2. The method of claim 1, further comprising:
    providing a tubing having a predetermined portion;
    disposing the medium within the tubing wherein the medium is a fluid;
    pumping the fluid through the tubing at a rate of about 0.1 $cm^3$/s to about 20 $cm^3$/s.

3. The method of claim 2, wherein the initial temperature of the fluid is from about 0° C. to about 50° C.

4. The method of claim 2, wherein the signal generates an exposure area, wherein the step of directing the signal is comprised of directing the signal toward the medium disposed within the predetermined portion, and wherein the step of exposing is comprised of exposing the one or more contaminants to the signal's exposure area for the predetermined amount of time.

5. The method of claim 4, wherein the predetermined amount of time is from about 5 seconds to about 5 minutes.

6. The method of claim 1, wherein the medium is a filter.

7. The method of claim 1, wherein the medium is water.

8. The method of claim 1, wherein the step of generating is comprised of generating a signal having a frequency from about 35 GHz to about 100 GHz with the microwave energy radiation device.

* * * * *